United States Patent [19]
Sadhir

[11] Patent Number: 5,172,567
[45] Date of Patent: Dec. 22, 1992

[54] EUTECTIC BEAMS FOR USE IN REFRIGERATION

[75] Inventor: Rajender K. Sadhir, Murrysville Boro, Pa.

[73] Assignee: Thermo King Corporation, Minneapolis, Minn.

[21] Appl. No.: 706,813

[22] Filed: May 29, 1991

[51] Int. Cl.$^5$ ............... F25D 17/02; F25D 11/00; F25B 39/02
[52] U.S. Cl. .................... 62/434; 62/430; 62/439; 62/272; 165/10
[58] Field of Search .......... 62/430, 434, 439, 272; 165/10

[56] References Cited

U.S. PATENT DOCUMENTS

| | | | |
|---|---|---|---|
| 3,744,272 | 7/1973 | Oldberg | 62/439 |
| 4,103,510 | 8/1978 | Hall | 62/430 |
| 4,367,633 | 1/1983 | Strathnan | 62/337 X |
| 4,403,645 | 9/1983 | MacCracken | 62/430 X |
| 4,412,429 | 11/1983 | Kohl | 62/347 |
| 4,422,305 | 12/1983 | Grosskopf | 62/430 |
| 4,459,826 | 7/1984 | Hirano et al. | 62/430 |
| 4,928,501 | 5/1990 | Negeshi | 62/430 X |
| 5,033,272 | 7/1991 | Yoshikawa et al. | 62/272 X |

FOREIGN PATENT DOCUMENTS

| | | | |
|---|---|---|---|
| 1049882 | 2/1959 | Fed. Rep. of Germany | 62/430 |
| 1147605 | 4/1963 | Fed. Rep. of Germany | 62/275 |
| 2535947 | 3/1976 | Fed. Rep. of Germany | 62/430 |
| 2440531 | 7/1980 | France | 62/434 |
| 1-80053 | 5/1989 | Japan | |
| 435423 | 12/1974 | U.S.S.R. | 62/430 |
| 2180191 | 3/1987 | United Kingdom | |

OTHER PUBLICATIONS

Thermal Conductivity of a Polymer Filled with Particles in the Wide Range from Low to Super-High Volume Content, Journal of Applied Power Science, vol. 40, 929–941 (1990).

Primary Examiner—Henry A. Bennet
Assistant Examiner—Christopher B. Kilner
Attorney, Agent, or Firm—D. R. Lackey

[57] ABSTRACT

An eutectic beam which includes a plastic housing, an eutectic solution in the housing, and an evaporator tube in the eutectic solution having ends which extend outside the housing. The ends of the evaporator tube are adapted for connection to a refrigeration system. The evaporator tube is formed of copper having a thin protective coating on its outer surface formed of plastic, which is preferably a two component, filled epoxy resin system. The housing, in a preferred embodiment, is formed of a plastic, such as polyethylene, filled with a filler material selected to increase the thermal conductivity and thus the efficiency of the eutectic beam. In still another preferred embodiment, the filler material is also selected to increase both the electrical and thermal conductivity of the housing, with the housing including electrodes for electrically heating the housing to remove frost and ice build-up.

14 Claims, 6 Drawing Sheets

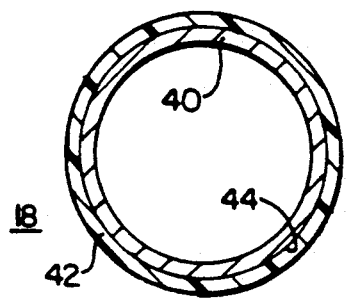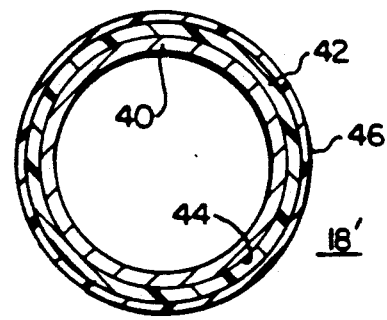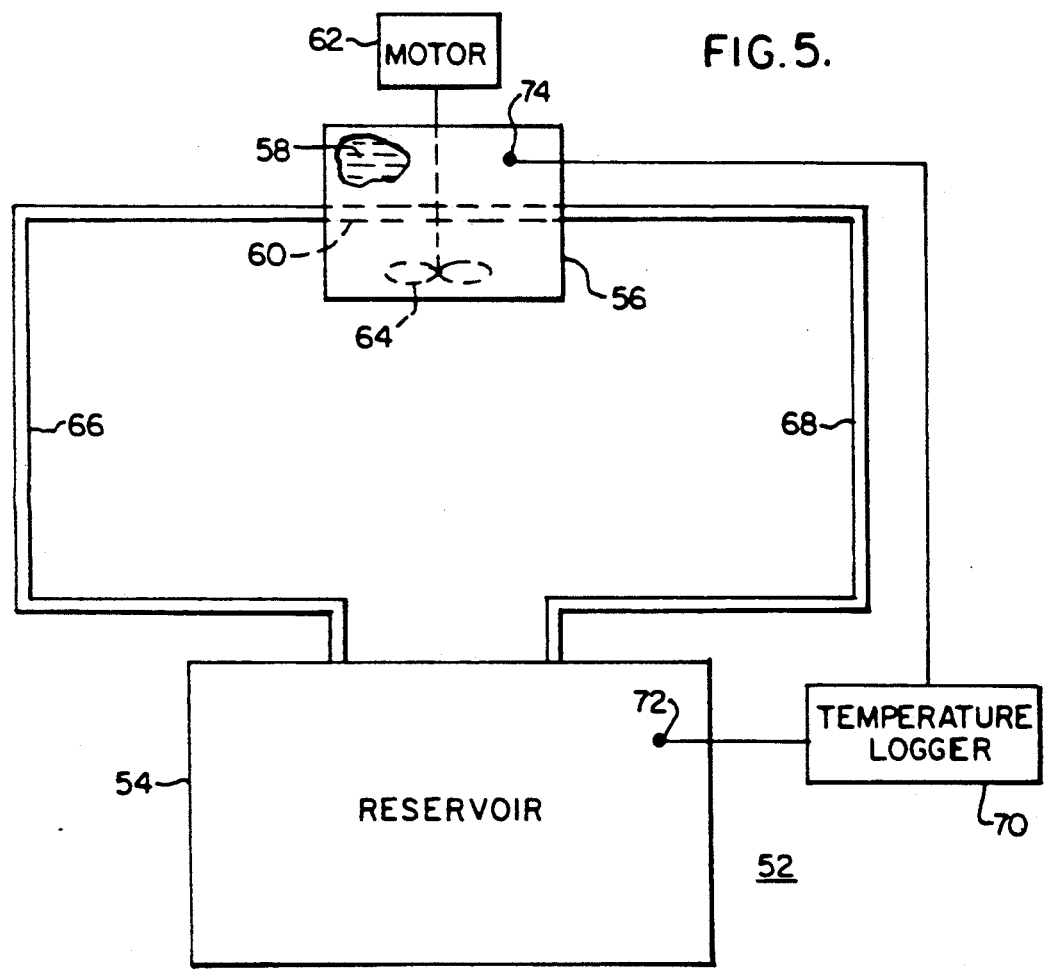

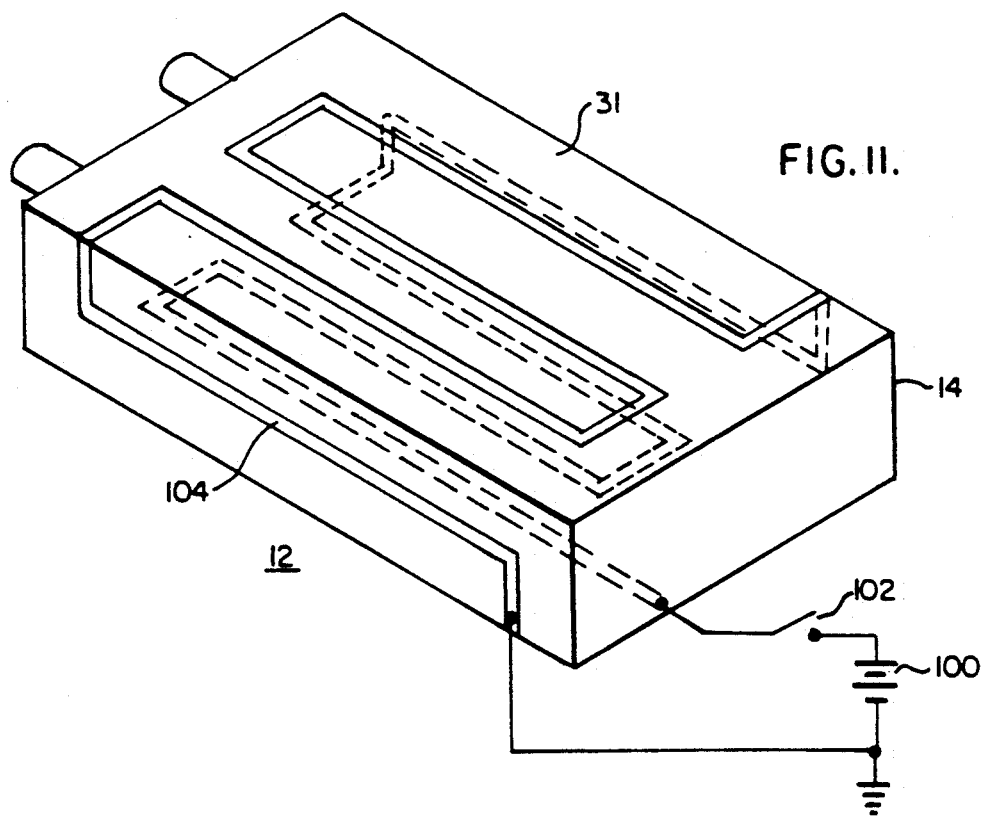
FIG. 11.
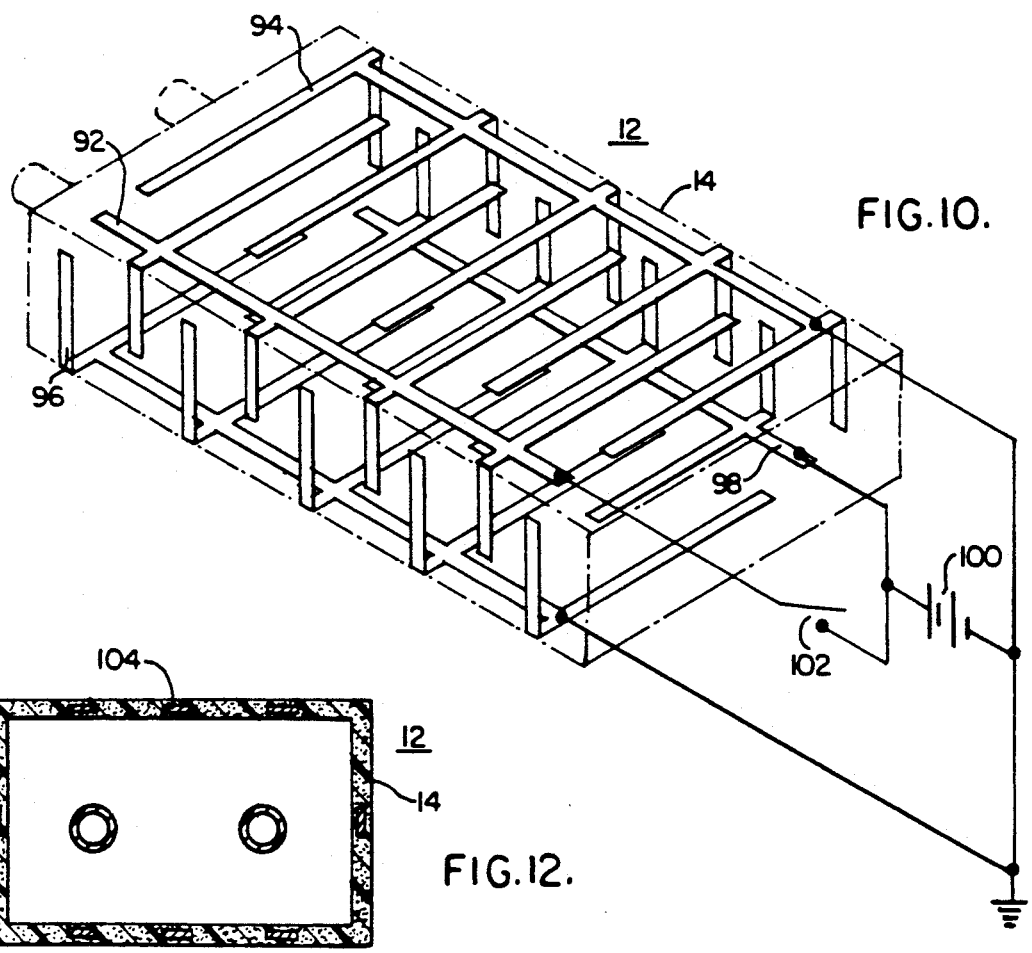
FIG. 10.
FIG. 12.

EUTECTIC BEAMS FOR USE IN REFRIGERATION

TECHNICAL FIELD

The invention relates in general to cooling devices, and more specifically to refrigeration capacity storage or hold-over units commonly called eutectic plates or eutectic beams.

BACKGROUND ART

Eutectic beams are commonly used to refrigerate the cargo space of a small delivery, truck. A eutectic beam works on the principal of heat transfer during freezing and melting of an eutectic solution, such as sodium nitrate ($NaNO_3$), ammonium chloride ($NH_4Cl$), brine, and the like. The specific eutectic solution used is determined by the desired temperature of the cargo space. An eutectic beam may be charged during night storage of an associated truck, for example, by connecting the eutectic beam to an external condensing unit via flexible hoses; or, by operating a refrigeration system on the truck from a commercial power supply. If the truck has a refrigeration system, an eutectic beam may also be charged while the truck is in use.

An eutectic beam comprises a housing, an eutectic solution in the housing, and a metallic cooling pipe in the eutectic solution. When the eutectic solution is to be frozen, a refrigeration system, i.e., a condensing unit, is connected to the metallic cooling pipe, and a refrigerant is passed through the metallic pipe. The metallic pipe functions as an evaporator, removing heat from the eutectic solution until it is frozen. For purposes of simplicity, the metallic pipe in an eutectic beam will be hereinafter called the evaporator tube.

Eutectic beams of which I am aware commonly utilize plastic for the housing, such as polyethylene, with the metallic evaporator tube being constructed either of copper, or steel tubing coated with a 1 mm thick protective layer of polyethylene.

Plastic is commonly used for the housing, instead of metal, because of corrosion problems, notwithstanding that the plastic reduces, the efficiency of an eutectic beam due to its lower thermal conductivity.

Copper is used for some evaporator tubes, even though it corrodes rather rapidly in commonly used eutectic solutions, with and without corrosion inhibitors. requiring costly replacement at regular maintenance intervals. The use of plastic coated steel tubing for the evaporator tube solves the corrosion problem, and is thus used in some eutectic beams for that reason. Plastic coated pipe, however, is much heavier than copper, and it has the further disadvantage of having a much poorer thermal conductivity than copper.

It would thus be desirable, and it is an object of the invention, to improve both the life and efficiency of an eutectic beam, without concomitant offsetting disadvantages, such as cost.

SUMMARY OF THE INVENTION

Briefly, the present invention is an eutectic beam comprising a housing, an eutectic solution in the housing, and an evaporator tube in the eutectic solution. The evaporator tube includes ends which extend through the housing, with the tube ends being adapted for connection to a refrigeration system. The evaporator tube is constructed of copper having a protective coating formed of plastic on the outer surface thereof, with the protective coating being selected to prevent or significantly reduce corrosion of the copper in an eutectic solution.

In a preferred embodiment of the invention, the protective plastic coating on the evaporator tube is an epoxy system, preferably a two component, room temperature curable, filled epoxy system.

In still another embodiment of the invention, the housing is preferably formed of a plastic material filled with a filler material which increases at least the thermal conductivity of the plastic material, and preferably both the thermal and electrical conductivity of the plastic material. When the selected filler increases both the thermal and electrical conductivity of the housing, in still another embodiment of the invention the housing is electrically heated when defrosting is required, using heat loss in the plastic material itself to raise the temperature of the housing.

BRIEF DESCRIPTION OF THE DRAWINGS

The invention will become more apparent by reading the following detailed description in conjunction with the drawings, which are shown by way of example only, wherein:

FIG. 2 is a cross-sectional view through the evaporator tube of the eutectic beam shown in FIG. 1, illustrating a copper tube having a single coat of an epoxy resin system, according to an embodiment of the invention;

FIG. 3 is a cross-sectional view, similar to that of FIG. 2, except illustrating a copper tube having a double coat of an epoxy resin system, according to another embodiment of the invention;

FIG. 5 is a schematic diagram of apparatus for measuring the heat transfer of different evaporator tube constructions, including the heat transfer of virgin copper, the heat transfer of polyethylene coated steel, and the heat transfer of copper protected according to the teachings of the invention;

FIG. 10 is a perspective view of an eutectic beam, shown in phantom, with interdigitated electrodes arranged to provide current flow through the material of the eutectic beam housing, when the electrodes are connected to a source of electrical potential, to defrost the housing of the eutectic beam;

FIG. 11 is a perspective view of an eutectic beam which utilizes the superior thermal conductivity of a housing constructed according to the teachings of the invention to defrost the housing using resistive wire placed in contact with the outer surface of the housing; and FIG. 12 is a cross sectional view of the eutectic beam shown in FIG. 11, illustrating resistive wire embedded in the material of the housing, rather than being in contact with the outer surface of the housing.

DESCRIPTION OF PREFERRED EMBODIMENTS

Figure 1:
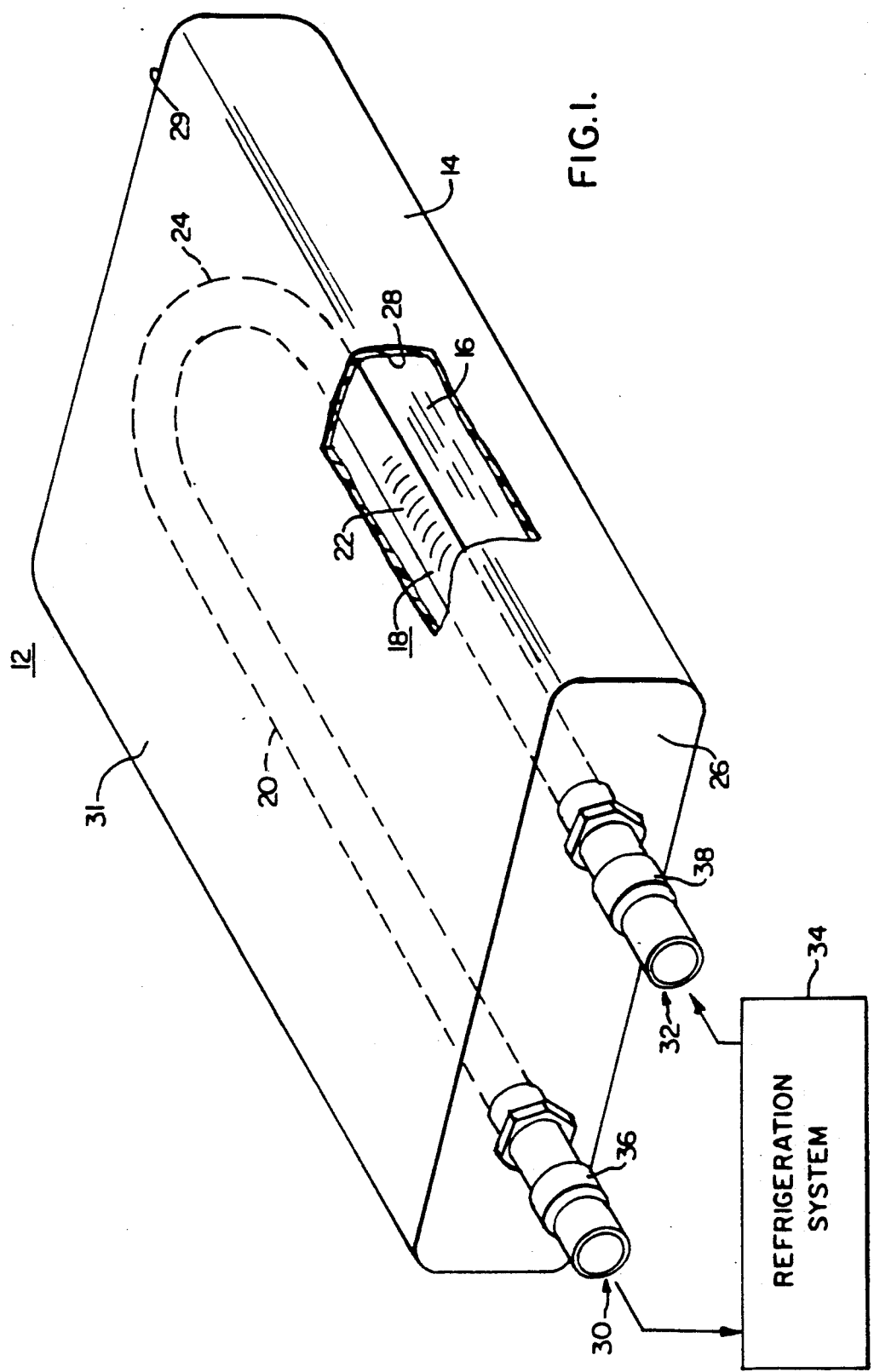
FIG. 1 is a perspective view, partially cut away, of an eutectic beam having an evaporator tube and housing which may be constructed according to the teachings of the invention.

Referring now to the drawings, and to FIG. 1 in particular, there is shown an eutectic beam 12 of the type which may be constructed according to the teachings of the invention. Eutectic beam 12 includes a rather flat, elongated housing 14, an eutectic solution 16 in housing 14, and a cooling pipe or evaporator tube 18.

Evaporator tube 18, which preferably has the U-shaped configuration illustrated, includes first and second leg portions 20 and 22, and an interconnecting bight 24. The first and second leg portions 20 and 22 extend in liquid tight relation through a common end wall 26 of housing 14, with end wall 26 also mounting and supporting evaporator tube 18. One or more support webs (not shown) may be provided within housing 14, which extend between the encased portion of legs 20 and 22 and/or bight 24 of the evaporator tube 18, and portions of the inner surface 28 of housing 14, to provide additional support for the evaporator tube 18. Housing 14 includes a second end wall 29 and four sides which collectively define an outer surface 31.

Leg portions 20 and 22 terminate in ends 30 and 32, respectively, which are outside housing 14, with ends 30 and 32 including fittings 36 and 38 which are adapted for connection to a refrigeration system 34. Refrigeration system 34, as is well known in the art, conventionally includes a refrigerant compressor driven by a suitable prime mover, and a condensing unit. The eutectic beam 12, when connected to refrigeration system 34 for charging, provides the function of an evaporator unit for refrigeration system 34.

A first aspect of the invention is directed to providing an evaporator tube 18 which is resistant to corrosion when immersed in commonly used eutectic solutions, and which has the further characteristics of having excellent heat transfer capability and light weight. Commonly used eutectic solutions include the hereinbefore mentioned ammonium chloride and sodium nitrate, available with and without a corrosion inhibitor, such as sodium chromate. Commercially available eutectic solutions include Frig A Bohn -26, Frig A Bohn -32, and Polar Pac-33.

I have found that copper tubing coated with a thin, uniform protective layer of plastic, preferably a filled epoxy resin system, provides the requisite corrosion resistance while retaining the advantages of the unprotected copper tubes used in prior art eutectic beams, i.e., superior heat transfer and light weight. The filled epoxy may be either the type of epoxy based upon bisphenol A, or the aliphatic type, as desired.

DuPont's two component, room temperature curing, filled epoxy resin system sold under the trade name Corlar, has been found to provide excellent results, but other epoxy resin systems should also provide good results, especially if they are filled epoxy systems, with the filler or fillers being selected for corrosion resistance. Room temperature curing is also a desirable feature, as it eliminates the expense and complexity associated with heating the coating after the resin system is applied. Heat cured epoxies, however, are suitable functionally. The filled epoxy is a very desirable feature, especially when the filler, or fillers, are selected to increase corrosion resistance and thermal conductivity of the epoxy system.

FIG. 2 is a cross sectional view of evaporator tube 18 constructed according to the teachings of the invention, illustrating copper tubing 40 having a layer 42 of epoxy resin on the outer surface 44 of the tubing. The thickness of layer 42 is preferably at least 0.001 inch (0.025 mm), and as will be hereinafter described, a double coating of epoxy having a total thickness of 0.008 inch (0.2 mm) thick is preferred in order to insure a uniform continuous coating of the entire outer surface 44 of tubing 40. FIG. 3 is a cross sectional view of an evaporator tube 18' constructed with a double coating of epoxy, illustrating copper tubing 40 with the layer 42 of epoxy shown in FIG. 2, and also with a second layer 46 of epoxy.

To illustrate the corrosion resistance of epoxy coated copper in commonly used eutectic solutions, as well as to optimize the thickness of the epoxy coating, the following samples were prepared:

a) Copper tubing, without any coating, with the virgin copper tubing having a nominal outside diameter (OD) of 0.6388 inch (16.22 mm) and a wall thickness of 0.0532 inch (1.35 mm);

b) Epoxy (Corlar) coated copper tubing having the same dimensions as sample a) and a coating thickness of 0.004 inch (0.1 mm), comprising primer and 1 coat of epoxy;

c) Epoxy (Corlar) coated copper tubing having the same dimensions as sample a) and a coating thickness of 0.008 inch (0.2 mm), comprising primer and 2 coats of epoxy;

d) Epoxy (Corlar) coated copper tubing having the same dimensions as sample a) and a coating thickness of 0.0091 inch (0.23 mm), comprising primer and three coats of epoxy;

e) Epoxy (Corlar) coated copper tubing having the same dimensions as sample a) and a coating thickness of 0.0075 inch (0.19 mm), comprising primer and one heavy coat of epoxy;

f) Epoxy (Limitrak) coated copper tubing having the same dimensions as sample a) and a coating thickness of 0.0075 inch (0.19 mm), comprising primer and one coat of Limitrak. Limitrak is a product of Westinghouse Electric Corporation, comprising a bisphenol-A-epoxy/polyamide resin filled with alumina trihydrate to a loading of 50% by volume;

g) Polyethylene coated stainless steel tubing, having a nominal OD of 0.7175 inch (18.22 mm) and a wall thickness of 0.1267 inch (3.2 mm), and with the polyethylene coating having a thickness of 0.040 inch (1 mm).

Figure 4:
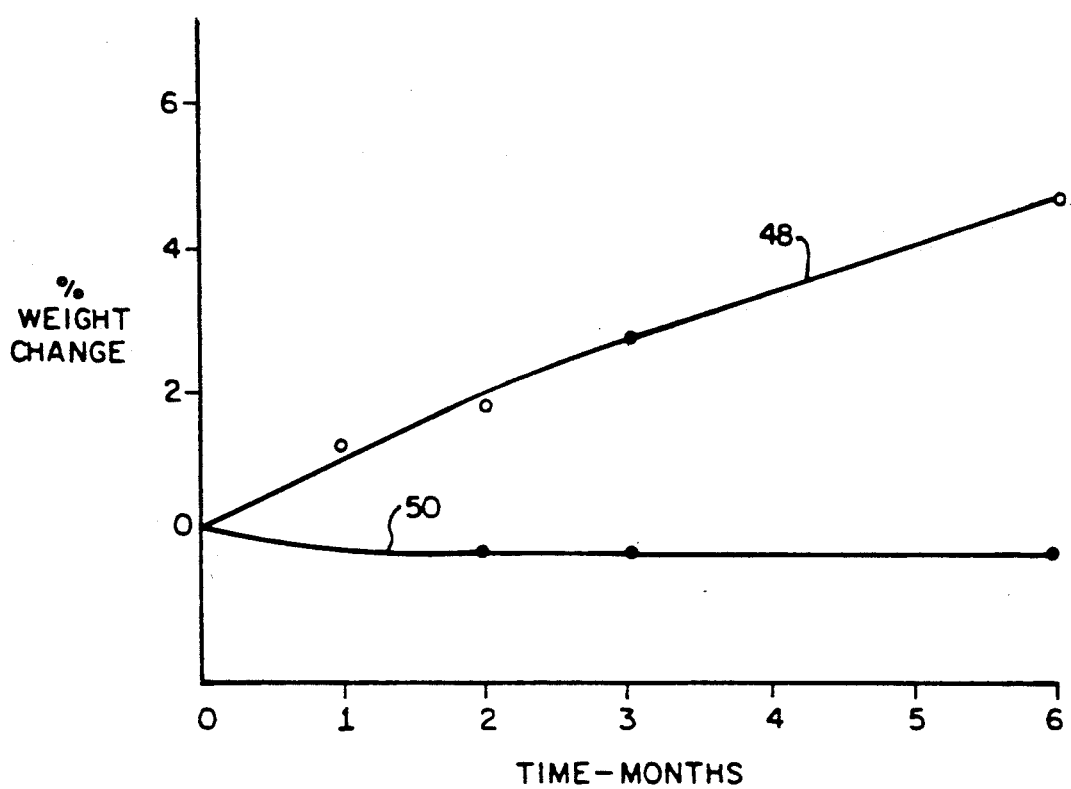
FIG. 4 is a graph which illustrates the change in weight, due to corrosion, versus time, of virgin copper tubing, and copper tubing protected according to the teachings of the invention, when immersed in the same eutectic solutions.

Thermal aging was carried out at 50° C. in the hereinbefore mentioned commercially available eutectic solutions. After each month the samples were taken from the solution, weighed and examined under a microscope for corrosion. Three months of testing to date have produced no weight loss and no visible corrosion on any of the epoxy coated samples, and no weight loss and no visible corrosion on any of the polyethylene coated steel samples. The virgin copper tubes, on the other hand, experienced weight loss, with 50% of their outer surfaces being corroded after one month. The virgin copper tubes continued to experience weight loss, with 95% of their outer surfaces being corroded after two months, and the weight loss continued to the end of the three month experiment, with 100% of their outer surfaces being corroded after 3 months. FIG. 4 is a graph which plots the weight change in per cent versus aging time in months, with curve 48 illustrating the % weight loss for virgin copper tubes, and curve 50 illustrating % weight loss for the epoxy coated tubes, in the same commercially available eutectic solutions. The weight losses indicated beyond 3 months are what are expected based upon the three month experience.

While the polyethylene coated steel tube showed no weight loss and no corrosion, the epoxy coated copper tubing is much more desirable than polyethylene coated steel, as the epoxy coated copper has a much higher thermal conductivity, and thus higher heat transfer efficiency, and also a much lower weight. To illustrate the marked difference in thermal conductivities between epoxy coated copper and polyethylene coated steel, FIG. 5 illustrates heat transfer apparatus 52 used to make heat transfer measurements. Apparatus 52 includes a reservoir 54 filled with fluid maintained at a constant temperature of −15° C., a smaller container 56 filled with a solution 58 of ethylene glycol and water having a constant mass, a tube sample 60 disposed in container 56, means for stirring the solution 58, such as a motor 62 connected to a stirrer 64 disposed in container 56, piping 66 and 68 which conveys liquid pumped at a constant rate from reservoir 54 through the tube sample 60, and a temperature logger 70 having thermocouples 72 and 74 respectively disposed in reservoir 54 and container 56.

By maintaining the mass in container 56 constant, the temperature of reservoir 54 constant, the rate at which liquid from reservoir 54 is pumped through the tube sample 60 constant, and the time duration of each test constant, the temperature change of the solution 58 in container 56 while using a tube sample other than virgin copper, compared with the temperature change of solution 58 when a tube sample of virgin copper is used, provides a heat capacity ratio which illustrates the thermal conductivity of each of the different tube samples compared with virgin copper.

Figure 6:
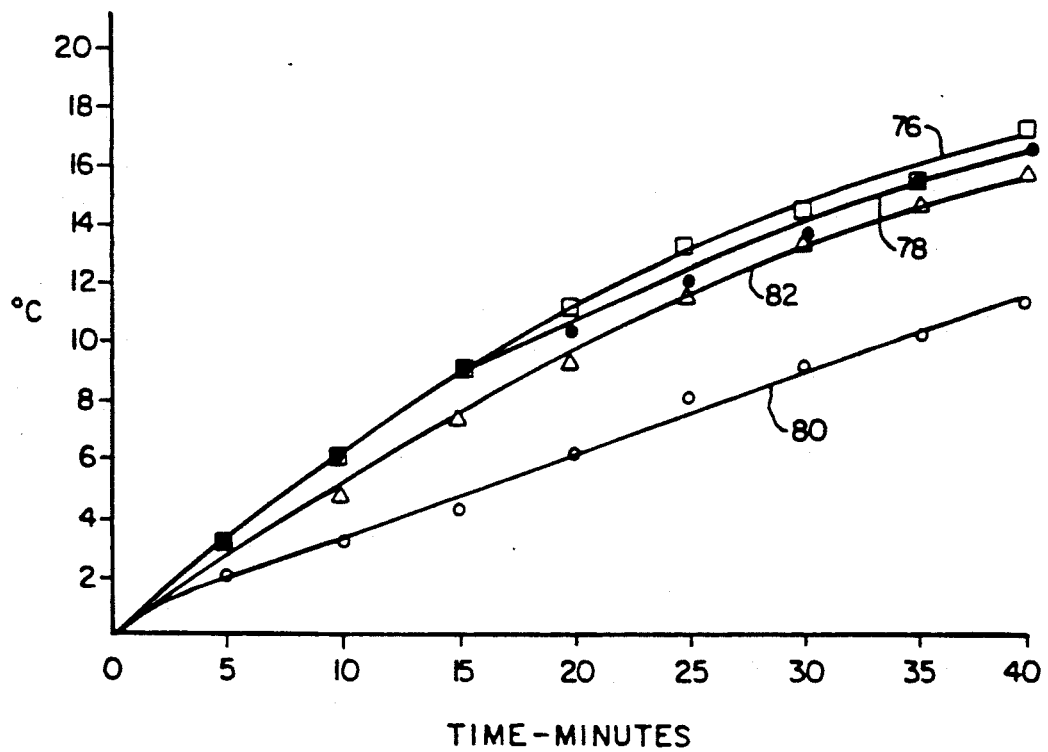
FIG. 6 is a graph which illustrates the change in the temperature versus time, of the different samples of evaporator tubes subjected to the heat transfer test of the apparatus shown in FIG. 5.

The heat capacity ratio of polyethylene coated steel was found to be 0.66, while the heat capacity ratios of epoxy coated copper were between 1.0 and 0.93, with the 0.93 occurring for sample e), the tube sample with the single heavy coat of Corlar epoxy. FIG. 6 is a graph which plots the reduction in temperature, in degrees C, of the solution 58 in container 56 for different tube samples, versus time. Curve 76 is for virgin copper, curve 78 is for a filled epoxy coated copper, and curve 80 is for polyethylene coated steel. Curve 82 is for a tin coated copper tube, which was not as good as a filled epoxy coated copper from a heat transfer standpoint, and which also proved poor from a corrosion standpoint. The tin coating slowly disappeared in the different eutectic solutions, allowing the copper below the coating to be attacked.

In preparing epoxy coated copper tubing according to the teachings of the invention, the copper tubing is first treated, such as by sand blasting, to remove scales, oxides, and oily soils. The primer and epoxy coatings are preferably applied by spraying, and to insure that the spraying is uniform, the two coat embodiment of FIG. 3 is preferred over the one coat embodiment of FIG. 2, with a preferred total thickness of primer and two coats of epoxy being about 0.008 inch (0.2 mm). The spray equipment may be a conventional spray gun, an airless spray unit, or an airless electrostatic spray unit, as desired. Using DuPont's Corlar as an example, the DuPont Corlar primer is catalyzed by mixing DuPont 825-8031 (or 825-Y-9031, a chrome-free primer) pigmented base with DuPont VG-Y-8339 activator. The Dupont Corlar epoxy is catalyzed by mixing DuPont 823-Y-67632 pigmented base with DuPont VG-Y-8339 activator. DuPont reducing solvent T-Y-3871 may be used to obtain the desired viscosity. The filler for the primer may include, for example, the following mixture of fillers, selected for corrosion resistance as well as reducing the cost of the primer: iron oxide, crystalline silica, magnesium silicate, barium metaborate, and organophillic clay. Typical total filler concentrations which are suitable, are preferably in the range of 30 to 70%, by volume. The filler for the epoxy applied over the primer may include, for example, the following mixture of fillers, again selected for corrosion resistance and for reducing the cost of the over-coat: titanium dioxide, barium sulfate, and magnesium silicate, with suitable filler concentrations being in the same range as the primer.

Housing 14 is preferably constructed of polyethylene, such as by rotomolding, injection molding, or by extrusion. Polyethylene is preferred because of its strength, impact resistance, ability to absorb the stresses of freezing the eutectic solution, and its ability to contain the eutectic solution without degradation. Linear polyethylene, such as DuPont's Sclair PE 8000 series, is preferred for housing 14, but other polyethylene may be used. Cross linked polyethylene may also be used, but it has the disadvantage of requiring higher processing temperatures than linear types. When rotomolding housing 14, powdered or small granules of polyethylene should be used, having a melt index in the range of 2-20, with 4-6 being preferred.

The thermal conductivity of polyethylene, however, is poor, which reduces the cooling efficiency of an eutectic beam. I have found that the cooling efficiency of an eutectic beam constructed of polyethylene may be significantly improved by filling the polyethylene with a filler selected to improve at least the thermal conductivity of polyethylene. In a preferred embodiment of the invention, the filler is selected to improve both the thermal and electrical conductivity of polyethylene, with the electrical conductivity being used to aid in the removal of frost and ice which builds up on the outer surface 31 of an eutectic beam 12 during use. The thermal conductivities of polyethylene and candidate fillers are listed in the following table.

TABLE

| Material | Thermal Conductivity |
| --- | --- |
| Polyethylene (M.W. 5000) | $6.8 \times 10^{-4}$ Cal/S cm °C. |
| Quartz | $2.3 \times 10^{-3}$ Cal/S cm °C. |
| Alumina | $8.0 \times 10^{-2}$ Cal/S cm °C. |
| Carbon Black (Graphitic) | $2.3 \times 10^{-3}$ Cal/S cm °C. |
| Carbon (diamond) | $5.5 \times 10^{-2}$ Cal/S cm °C. |

Figure 7:
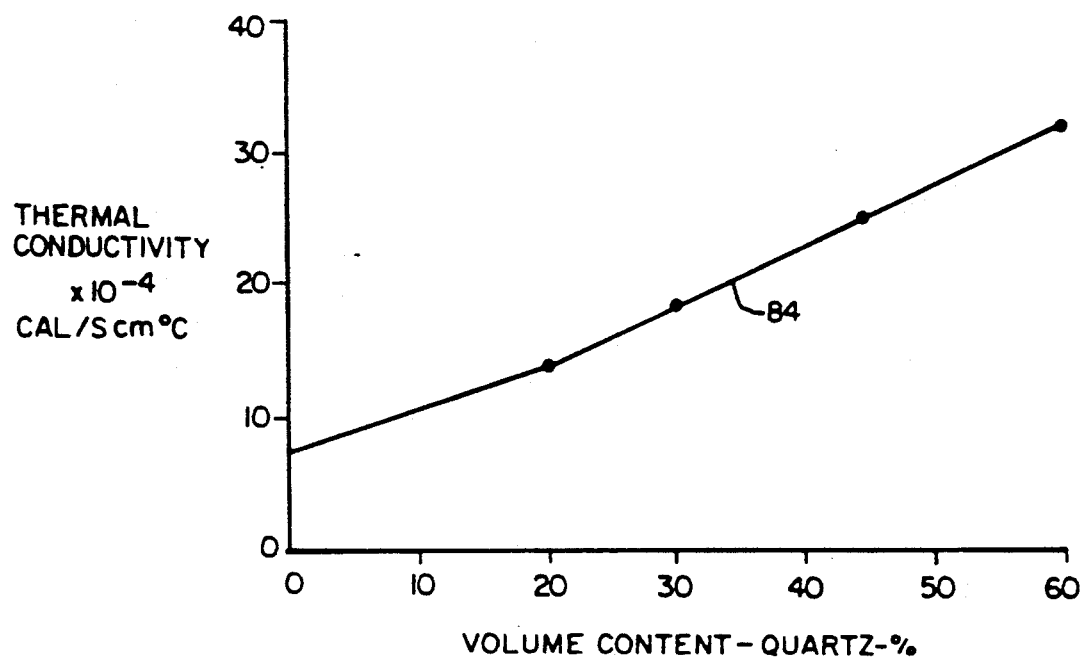
FIG. 7 is a graph which illustrates how the thermal conductivity of a polyethylene housing for an eutectic beam is improved with increasing concentrations of a finely divided quartz filler.
Figure 8:
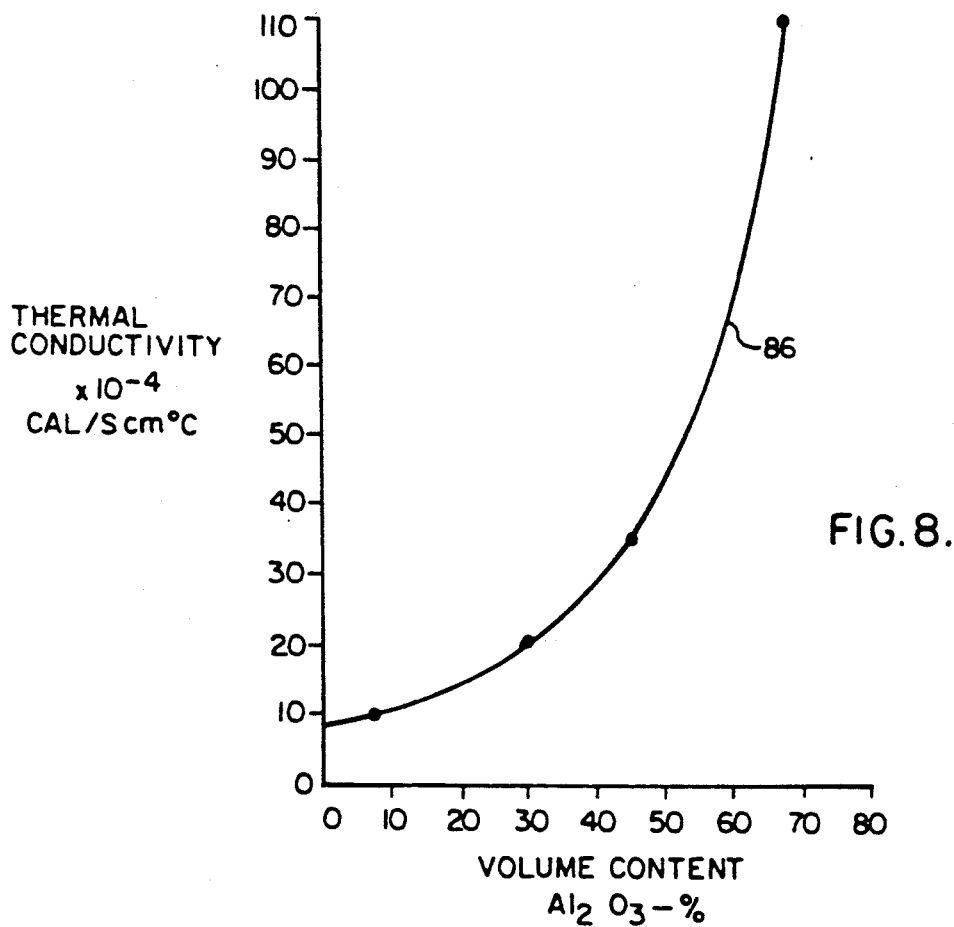
FIG. 8 is a graph which illustrates how the thermal conductivity of a polyethylene housing for an eutectic beam is improved with increasing concentrations of a finely divided alumina filler.

The desired thermal conductivity of polyethylene may be selected by blending appropriate concentrations of a selected filler, with minimal deterioration in mechanical properties. FIG. 7 is a graph having a curve 84 which illustrates the change in thermal conductivity of polyethylene as the concentration of a finely divided quartz filler is changed. In like manner, FIG. 8 is a graph having a curve 86 which illustrates the change in thermal conductivity of polyethylene as the concentration of a finely divided alumina filler is changed. While fillers have been added to polyethylene in the prior art to prevent static charge build-up, the additives, which are usually proprietary materials, are normally in concentrations of 1%, or less, by volume. The low concentrations for static control do not change the thermal conductivity of polyethylene to an extent which would be significant in improving the efficiency of an eutectic beam. This is apparent from observing FIGS. 7 and 8, which illustrate that highly filled systems are essential to improving thermal conductivity of polyethylene.

Figure 9:
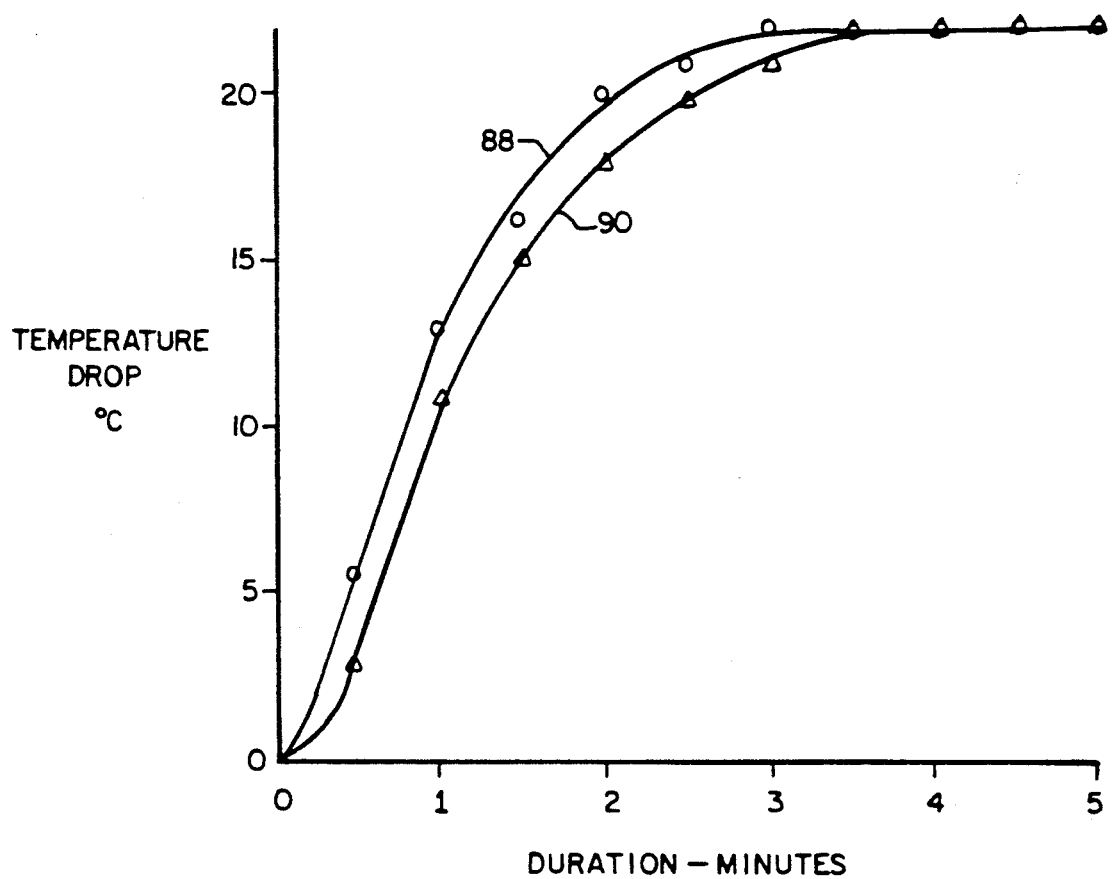
FIG. 9 is a graph which illustrates the superior heat transfer characteristics of an eutectic beam housing constructed of a highly filled polyethylene versus an un-filled polyethylene.

While quartz and alumina are excellent fillers for improving the thermal conductivity of polyethylene, a preferred filler is carbon black, especially the crystalline allotropic form of carbon, i.e., graphitic carbon black, which has high electrical and thermal conductivity, but furnace black may also be used. For improved thermal and electrical conductivity, a range of at least 2 to 40% carbon black by volume is required. FIG. 9 is a graph which illustrates the temperature drop on the outer surface of two polyethylene boxes filled with an equal amount of coolant having a temperature of $-20°$ C. One box was constructed of 0.125 inch (3.2 mm) thick polyethylene filled with a 15% concentration of carbon black, by volume, and the other box was constructed of 0.125 inch (3.2 mm) thick unfilled polyethylene. The temperature drop on the outer surfaces of the boxes is on the ordinate, and time is on the abscissa. Curve 88 illustrates the temperature drop on the surface of the carbon black filled polyethylene, while curve 90 illustrates the temperature drop on the surface of the unfilled polyethylene.

While concentrations of 2 to 15% carbon black will significantly improve the thermal conductivity of polyethylene, with the thermal conductivity increasing as the concentration is increased, concentrations of carbon black which will provide an electrical conductivity having a significant $I^2R$ loss when defrosting is required, requires still greater concentrations, such as 15 to 40%. The desired electrical conductivity is simply a matter of selecting the concentration. For example, incorporation of 39% carbon black in polyethylene improves the electrical conductivity from $10^{-16}$(ohm cm)$^{-1}$ to $1.4 \times 10^{-2}$ (ohm-cm)$^{-1}$.

The electrical conductivity of polyethylene filled with 39% carbon black was demonstrated by applying two thin silver electrodes 1.5 cm long to the surface, spaced 0.9 cm apart, and applying 2 volts between them. This resulted in a current flow of 0.1 ampere. A thermocouple between the two electrodes measured a temperature increase in the filled polyethylene material of 2° C. after 10 minutes.

FIG. 10 is a perspective view of eutectic beam 12, with beam 12 shown in phantom, illustrating how a polyethylene housing 14 may be constructed to take advantage of a filler which increases the electrical conductivity of polyethylene. Interdigitated electrodes 92, 94, 96 and 98 are either applied to the outer surface of housing 14, or they may be embedded therein. Electrodes 92 and 98 are connected to one side of a source of potential, indicated by battery 100, but any suitable source may be used, and electrodes 94 and 96 are connected to the other side of source 100. When defrosting is required, a switch 102 is closed for a predetermined period of time.

The improved thermal conductivity of polyethylene filled according to the teachings of the invention also enhances other forms of defrosting than the type illustrated in FIG. 10 which used the electrical resistivity of filled polyethylene to provide heat in the form of an $I^2R$ loss in the material itself. As illustrated in FIG. 11, a resistive wire 104 may be applied to the outer surface 31 of housing 14 and connected to source 100 of electrical potential via switch 102. When defrosting is required, switch 102 is closed, wire 104 increases its temperature, and the improved thermal conductivity of the filled polyethylene housing 14 conducts heat between the wire turns to defrost the housing. The resistive wire 104 may be embedded in the filled polyethylene, instead of being applied to the outer surface 31 of housing 14, with FIG. 12 being a cross sectional view of eutectic beam 12 with conductor 104 embedded in the filled polyethylene material of housing 14.

In summary, the invention improves the efficiency of an eutectic beam 12 in two significant ways, which are preferably both utilized, but which may be used singly if desired. The first improvement relates to the evaporator tube 18, wherein a filled epoxy coated copper tube 40 is utilized. This solves the corrosion problem of virgin copper in eutectic solutions, without sacrificing weight and without reducing the heat transfer efficiency of the evaporator tube. The second improvement relates to the housing 14 of eutectic beam 12, using filled polyethylene, with the filler being primarily selected to improve the heat conductivity, to thus improve the heat transfer efficiency of the eutectic beam. In a preferred embodiment of the housing, the filler is selected to improve both the thermal and electrical conductivity of polyethylene, enabling the housing material itself to be used as an electrical circuit during electrical defrosting, providing an $I^2R$ loss directly in the material for fast efficient defrosting of eutectic beam 12.

I claim:
1. An eutectic beam comprising:
a housing,
said housing being formed of a plastic material having a filler of carbon black, to increase the thermal and electrical conductivity of the plastic material,
an eutectic solution in said housing,
and an evaporator tube in the eutectic solution having ends which extend through said housing which are adapted for connection to a refrigeration system,
said evaporator tube being constructed of copper having a protective coating formed of plastic on the outside surface thereof.

2. The eutectic beam of claim 1 wherein the protective coating on the evaporator tube is an epoxy system.

3. The eutectic beam of claim 1 wherein the protective coating on the evaporator tube is a two component, room temperature curable epoxy system.

4. The eutectic beam of claim 1 wherein the protective coating on the evaporator tube is a two component, room temperature curable, filled epoxy system.

5. The eutectic beam of claim 1 wherein the protective coating is formed of two layers of plastic having a combined thickness dimension of about 0.2 mm.

6. The eutectic beam of claim 1 including means for defrosting the plastic housing.

7. The eutectic beam of claim 6 wherein the means for defrosting the plastic housing includes electrical resistance heating means in contact with the outside of the plastic housing.

8. The eutectic beam of claim 6 wherein the means for defrosting the plastic housing includes electrical resistance heating means embedded in the plastic material of the housing.

9. An eutectic beam comprising:
a housing,
said housing being formed of a plastic material filled with a filler material which increases the thermal and electrical conductivity of the plastic material,
means for defrosting the plastic housing,
said means for defrosting the plastic housing including interdigitated electrodes associated with the plastic housing which, when energized by a source of electrical potential, causes an electrical current to flow through the plastic housing, heating the housing with the resultant $I^2R$ loss,
an eutectic solution in said housing,
and an evaporator tube in the eutectic solution having ends which extend through said housing which are adapted for connection to a refrigeration system,
said evaporator tube being constructed of copper having a protective coating formed of plastic on the outside surface thereof.

10. An eutectic beam comprising:
a housing,
an eutectic solution in said housing,
and an evaporator tube in the eutectic solution having ends which extend through said housing which are adapted for connection to a refrigeration system,
said housing being formed of a plastic material having a filler of carbon black, which increases the thermal and electrical conductivity of the plastic material.

11. The eutectic beam of claim 10 including means for defrosting the plastic housing.

12. The eutectic beam of claim 11 wherein the means for defrosting the plastic housing includes electrical resistance heating means in contact with the outside of the plastic housing.

13. The eutectic beam of claim 11 wherein the means for defrosting the plastic housing includes electrical resistance heating means embedded in the plastic material of the housing.

14. An eutectic beam comprising:
a housing,
an eutectic solution in said housing,
and an evaporator tube in the eutectic solution having ends which extend through said housing which are adapted for connection to a refrigeration system,
said housing being formed of a plastic material filled with a filler material which increases the thermal and electrical conductivity of the plastic material,
and means for defrosting the plastic housing, including interdigitated electrodes associated with the plastic housing which, when energized by a source of electrical potential, causes an electrical current to flow through the plastic housing, heating the housing with the resultant $I^2R$ loss.

* * * * *